United States Patent [19]

Park et al.

[11] Patent Number: 4,496,620

[45] Date of Patent: Jan. 29, 1985

[54] OPAQUE ORIENTED NON-THERMOPLASTIC POLYMER FILM AND METHOD OF FORMING SAME

[75] Inventors: Hee C. Park, Fairport; Charles R. Ashcraft, Victor, both of N.Y.

[73] Assignee: Mobil Oil Corporation, New York, N.Y.

[21] Appl. No.: 555,254

[22] Filed: Nov. 25, 1983

[51] Int. Cl.³ .......................... B32B 3/26; B32B 7/02
[52] U.S. Cl. ............................. 428/323; 156/229; 264/210.7; 428/325; 428/327; 428/328; 428/338; 428/500; 428/910
[58] Field of Search ............. 156/229; 264/210.7; 428/323, 325, 327, 328, 338, 500, 910

[56] References Cited

U.S. PATENT DOCUMENTS

| | | | |
|---|---|---|---|
| 3,695,989 | 10/1972 | Albert | 428/913 |
| 3,762,454 | 10/1973 | Wilkins, Jr. | 428/913 |
| 4,118,438 | 10/1978 | Matsui et al. | 428/338 |
| 4,377,616 | 3/1983 | Ashcraft et al. | 428/910 |
| 4,384,023 | 5/1983 | Okamura et al. | 428/338 |

*Primary Examiner*—William J. Van Balen
*Attorney, Agent, or Firm*—Alexander J. McKillop; Michael G. Gilman; James P. O'Sullivan

[57] ABSTRACT

An opaque oriented non-thermoplastic polymer film containing opacifying voids which opacifying voids contain rigid microspheres therein. The method of preparing such an opaque oriented non-thermoplastic film by incorporating rigid microspheres within the non-thermoplastic polymer forming a film thereof and orienting the same to create opacifying voids therein.

16 Claims, No Drawings

OPAQUE ORIENTED NON-THERMOPLASTIC POLYMER FILM AND METHOD OF FORMING SAME

The present invention is concerned with an opaque oriented non-thermoplastic polymer film structure and to a method of forming said film structure.

It is known that opaque, thermoplastic films can be prepared by incorporating microspheres within said polymer, forming said polymer into a film by coextruding the same with a skin film thereon and biaxially orienting this structure to form in the central core layer a strata of opacifying voids. This technique is disclosed in U.S. Pat. No. 4,377,616, the disclosure of which is in its entirety incorporated herein by reference. This technique is limited to the formation of thermoplastic opaque films having non-void containing skin films which prevent the foulling of orientation equipment by the central core layer.

Certain polymers which can be classified as non-thermoplastic have excellent utility in film form as barrier layers which, for example, will not permit the transmission of oxygen or other gases to any substantial degree. Such films find use in food packaging to exclude the deleterious affects of air. Polyacrylonitrile film such as that formed by the process described in U.S. Pat. No. 4,066,731 is such a film. This patent is in its entirety incorporated herein by reference. Another such film is polyvinyl alcohol, such as that prepared by the technique described in U.S. Pat. No. 3,985,849, the disclosure of which is in its entirety incorporated herein by reference. It is an object of the present invention to improve these already excellent films by imparting an attractive opacity and increased flex life thereto without detracting from the outstanding gas vapor barrier characteristics of the films of this type.

SUMMARY OF THE INVENTION

The film structure of the present invention is an opaque, biaxially oriented non-thermoplastic film containing a strata of voids therein. Positioned at least substantially within at least a substantial number of said voids is at least one, at least generally spherical void initiating solid particle incompatible with said polymer. The void-space occupied by said particle being substantially less than the volume of said void, with one generally cross-sectional dimension of said particle at least approximating a corresponding cross-sectional dimension of said void. The population of voids in said film being such as to cause opacity in said film.

The process for preparing a film structure of this type comprises combining rigid microspheres with a biaxially orientable, non-thermoplastic polymer, said microspheres being at least substantially non-adherent to said polymer, forming a water-containing film of the microspheres-containing polymer; and biaxially stretching said film so as to form a strata of opacifying voids therein.

DETAILED DESCRIPTION OF THE INVENTION

The process of the present invention brings to the technology relating to non-thermoplastic polymer films a new dimension involving appearance and other beneficial physical characteristics which stem from the creation of the strata of opacifying voids processed into the non-thermoplastic polymer films. Such films are believed to be heitherto unknown and the presence of the strata of voids impart flexibility characteristics not present in the non-voided film.

As employed herein the term "non-thermoplastic polymer" obviously excludes those which can be readily brought to a melt flow condition by the application of heat. The phrase is intended to include those polymers which can be formed into a film by forming a solution or plastisol thereof with a suitable solvent or liquid. In addition these non-thermoplastic polymers in film form must be capable of being oriented in both orientation directions either before or after the solvent or liquid is removed from the film. As indicated above, non-limiting examples of the broadly contemplated non-thermoplastic polymers are polyvinyl alcohol and polyacrylonitrile, PAN, homopolymer. A satisfactory polyvinyl alcohol is one having a degree of polymerization of about 700 to 2,100, having a degree of hydrolysis of not less than 98% by mole and preferably not less than 99% by mole and an average molecular weight ranging from about 45,000 to 88,000. Conventional plasticizers, for example, polyhydric alcohols such as glycerine, can be incorporated into the resin. A polyvinyl alcohol of these characteristics can be biaxially stretched in both machine and transverse directions by any conventional orientation technique. The orientation can be by the process of the above-mentioned U.S. Pat. No. 3,985,849 or by techniques which employ a sequential orientation of polyvinyl alcohol film. For orientation of polyvinyl alcohol film, the water content should be from about 10–20% by weight.

The contemplated polyacrylonitrile is that defined in U.S. Pat. No. 4,261,874, the disclosure of which is also incorporated herein in its entirety by reference. While it is preferred that the homopolymer of acrylonitrile be employed, it is to be understood that copolymers of acrylonitrile may be employed when the units in said copolymer derived from the acrylonitrile monomer are present in an amount of at least about 85% by weight and preferably in an amount of at least 92% by weight.

The polyacrylonitrile may be prepared in any conventional manner, as by emulsion polymerization, suspension polymerization or solution polymerization. During its preparation the contemplated microspheres can be included in the system so that the starting material will already contain the appropriate proportion of microspheres. The same is true for the polyvinyl alcohol.

The following examples will describe an oriented film system where the microspheres are added to the polymer water system prior to extrusion of the same into an unoriented film.

The objects of the present invention are accomplished by providing within the contemplated polymers in film form a uniform distribution of microspheres. These microspheres must be present at the time of orientation and they function to provide void-initiation sites within the film during the process of orientation. Optimally the microspheres should be incompatible with or nonadherent to the polymer. Other than being totally encapsulated by the polymer matrix, it should ideally have no appreciable adherence to the adjacent polymer surface. Under the forces of orientation, both in the machine direction and the transverse direction, the polymer should be free to stretch away from the generally spherical surface of the microsphere and, as a result, a large void will be created about most of the microspheres. A typical void in the film will have major dimensions X and Y and a minor dimension Z, where dimension X is aligned with machine direction orientation, dimension Y is aligned with transverse direction orientation and dimension Z approximately corresponds to the cross-sectional dimension of the spherical particle which initiated the void.

It is preferred that the average particle size of the void-initiating particles be from about 0.1 to about 10 microns. These particles while preferably spherical in shape can also be oblate or somewhat offround so long as gross irregularities are not present. The void initiating particles can be of any solid or rigid material. They can be hollow spheres or solid throughout. They may be organic or inorganic, polymeric or non-polymeric. They must maintain their dimensional integrity throughout the process. These particles may be transparent or colored or specular. It is also to be understood that the contemplated polymer mattrix material may likewise contain coloring pigments dissolved or dispersed throughout in order to impart tone or tint to the polymer matrix. Microspherical particles which are incompatible with or nonadherent to the contemplated polymers include spheres of nylon, silicate glasses, polypropylene, teflon, metals such as steel, copper, aluminum, ceramic spheres, etc. While the preferred particle size of these spheres is from about 0.1 to about 10 microns, it is particularly preferred that the particle size range from about 0.75 to about 2 microns. The void initiating particles can be present in up to about 30% by weight and preferably from 2 to about 15% by weight.

It is not important how or when the microspheres are incorporated into the film structure so long as they are present at the time of biaxial orientation. Thus, the microspheres can be incorporated into the starting polymer during formation of the polymer or they may be introduced into the system any time up to formation of the unoriented film.

EXAMPLE 1

Polyvinyl alcohol powder having a degree of polymerization of about 1700 and a degree of hydrolysis of 99.95 mole percent is combined with water to form a combination containing 40% by weight of water. This combination is still ostensibly a dry powdered product. To this combination is added microspheres of polypropylene. The particle size of the microspheres range from 2-5 micron. The spheres are present in from 7 weight % based upon the weight of the polyvinyl alcohol. This combination is placed into a vented extruder and plasticated by heating to a temperature of about 150° C. taking care not to exceed the melting point of the polypropylene spheres. After a uniform dispersion of the microspheres is achieved, the resulting plastisol is cooled to a range of about 95°–115° C. and extruded through a slot die onto a chilled cast roll. The extruded film is approximately 25 mils in thickness. Using a Bruckner orientation system, the film is biaxially oriented and dried to at least substantially eliminate the $H_2O$. The final water content will be less than 3% by weight of the film. The biaxial orientation results in a film which has been oriented 4 times in the machine direction and 5 times in the transverse direction to yield a film 1.5 mils in thickness. The result will be a white opaque film of attractive appearance and stiffness. None of the other physical characteristics of the polyvinyl alcohol in film form will be adversely affected. The film will have an increased Gelbo flexibility. Its increased stiffness will assist machinability during packaging.

EXAMPLE 2

Polyacrylonitrile homopolymer aquagel film is made according to U.S. Pat. No. 4,066,731, except that 10% by weight glass spheres based on the weight of the PAN resin, is incorporated into the dimethyl sulfoxide-polyacrylonitrile resin solution. The average particle size of the microspheres ranges from about 2-5 microns. The dimethyl sulfoxide-polyacrylonitrile-glass spheres composition is extruded onto a chill roll to yield a sheet approximately 10 mils in thickness. This film is backwashed with water in order to at least substantially displace the dimethyl sulfoxide therein. The approximately 10 mil thick film is longitudinally stretched about two times on a machine direction orientor employing differential speed rolls. The film is then stretched on a TDO tentering apparatus for lateral stretching approximately three times. A radiant heater bank at least substantially removes water from the biaxially oriented film. The resulting film will be approximately 1.5 mils in thickness and be of an attractive white opaque appearance. This film will have excellent barrier characteristics and an improved Gelbo flexibility.

It is to be understood that films employed by the present technique can have any additional surface coatings applied thereto in order to facilitate its ultimate end use, for example, as a food packaging film.

What is claimed is:

1. An opaque, oriented non-thermoplastic polymer film containing a strata of voids therein, positioned at least substantially within at least a substantial number of said voids, is at least one at least generally spherical void-initiating, solid particle which is phase-distinct and incompatible with said polymer, the void occupied by said particle being substantially less than the volume of said void, with one generally cross-sectional dimension of said particle at least approximately a corresponding cross-sectional dimension of said void, the population of voids in said film being such as to cause opacity.

2. The film of claim 1 wherein said non-thermoplastic polymer is a member selected from the group consisting of polyvinyl alcohol and polyacrylonitrile.

3. The film of claim 2 wherein said spherical particles have a particle size ranging from about 0.1-10 microns.

4. The film of claim 3 wherein said spherical particles are inorganic or organic.

5. The film of claim 4 wherein said spheres are present in from 2 to 30% by weight based on the weight of said film.

6. The film of claim 5 wherein the resin, the spheres or both contain coloring pigments.

7. The film of claim 3 wherein said non-thermoplastic resin is polyvinyl alcohol.

8. The film of claim 3 wherein said non-thermoplastic resin is polyacrylonitrile.

9. The structure of claim 1 wherein said voids have a dimension of X, Y and Z, wherein dimensions X and Y are major dimensions and dimension Z is a minor dimension at least generally corresponding to the diameter of said spherical particle.

10. The structure of claim 4 wherein dimensions X and Y are multiples of dimension Z.

11. The method of preparing an opaque, oriented, non-thermoplastic film comprising:
    uniformly dispersing rigid microspheres within an orientable non-thermoplastic polymer said microspheres being at least substantially non-adherent to said polymer, forming a water-containing film of the microspheres-containing polymer; and biaxially stretching said film so as to form a strata of opacifying voids therein.

12. The method of claim 11 wherein said polymer is a member selected from the group consisting of polyvinyl alcohol and polyacrylonitrile.

13. The method of claim 12 wherein said polymer is polyvinyl alcohol and said water is the residue of an amount permitting formation of the polymer in film form.

14. The method of claim 13 wherein said film contains from about 10-20% by weight water content before stretching.

15. The method of claim 12 wherein said polymer is polyacrylonitrile and the microspheres-containing polyacrylonitrile dispersion is initially formed into a dimethyl sulfoxide containing film which is thereafter treated with water to at least substantially exchange said dimethyl sulfoxide therein with water to form said water-containing film.

16. The method of claim 15 wherein said water-containing film is biaxially stretched and while in said condition, dried to substantially remove water therefrom.

* * * * *